United States Patent [19]
Ladouceur

[11] 3,961,412
[45] June 8, 1976

[54] METHOD OF INSTALLING A FASTENER

[75] Inventor: Harold A. Ladouceur, Livonia, Mich.

[73] Assignee: Multifastener Corporation, Detroit, Mich.

[22] Filed: June 30, 1975

[21] Appl. No.: 591,669

Related U.S. Application Data

[60] Division of Ser. No. 476,747, June 5, 1974, Pat. No. 3,923,089, which is a continuation-in-part of Ser. No. 353,049, April 20, 1973, which is a continuation-in-part of Ser. No. 149,517, June 3, 1971, abandoned.

[52] U.S. Cl. .................................. 29/445; 29/509; 29/521; 29/522
[51] Int. Cl.² ..................... B23P 9/00; B21D 39/00; B23P 11/00
[58] Field of Search ............. 29/509, 432, 522, 512, 29/521, 445; 151/41.73, 41.72; 85/41

[56] References Cited
UNITED STATES PATENTS

| | | | |
|---|---|---|---|
| 1,600,665 | 9/1926 | Cocks | 85/41 UX |
| 2,004,182 | 6/1935 | Arey | 29/522 X |
| 2,379,804 | 7/1945 | Johnson | 151/41.73 X |
| 3,234,987 | 2/1966 | Hentzi | 151/41.73 X |
| 3,282,315 | 11/1966 | Zahodiakin | 29/432 X |
| 3,282,317 | 11/1966 | Zahodiakin | 151/41.73 |
| 3,510,929 | 5/1970 | Kilmarx | 29/432 X |

*Primary Examiner*—Charlie T. Moon
*Attorney, Agent, or Firm*—Cullen, Settle, Sloman & Cantor

[57] ABSTRACT

A nut for installation on a metal panel includes an end mounting face and a centrally located circular bore through said face for threadedly receiving a bolt. The nut further includes a counterbore concentric with the circular bore and axially terminating in an annular surface having a plurality of equally spaced points projecting toward the mounting face. The points define a crown-shaped indent having a valley between each pair of adjacent points for receiving panel material to stabilize the nut during a threading operation against rotational and axial displacement.

The method for installing the nut on the panel includes positioning the nut mounting face against a metal panel and piercing the panel in alignment with the nut bore axis to deflect the panel material circumscribed by the counterbore into said counterbore indent. The deflected material assumes an annular configuration projecting from the panel and terminating in a crown-shaped end portion adjacent and conjugate to the terminal end of the nut counterbore. The interlocking counterbore and panel projection configurations stabilize the nut on the panel and may be utilized in combination with a self-tapping bolt which is threaded into the counterbore to simultaneously thread the inner surface of the nut points and the terminal portion of the projection, before threading into the circular nut bore.

The piercing die for forming the panel projection and installing the nut on the panel includes an elongated piercing tool and a support structure for receiving and orienting the nut. The piercing tool includes a rounded tip having a plurality of flat surfaces or grooves inclined relative to the tool axis. The tip surfaces intersect to form a piercing point and tearing edges, which form the crown-shaped terminal portion of the panel projection.

4 Claims, 15 Drawing Figures

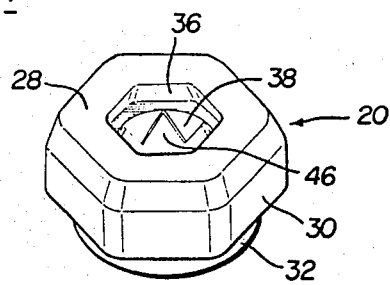
FIG. 1
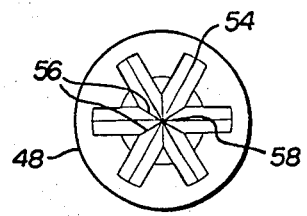
FIG. 5
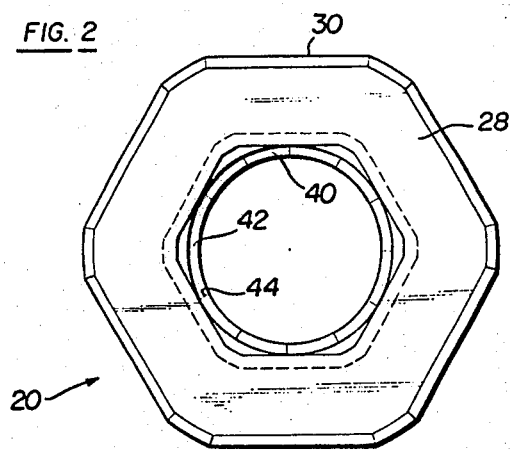
FIG. 2
FIG. 3
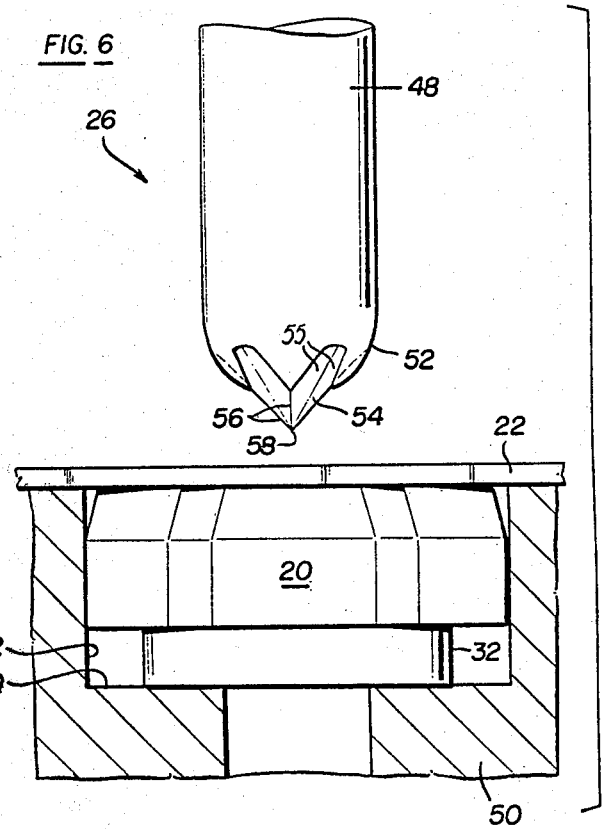
FIG. 6
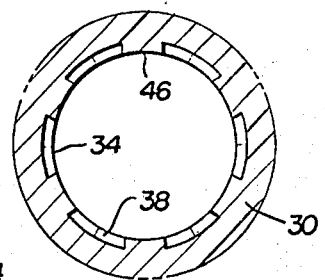
FIG. 4

METHOD OF INSTALLING A FASTENER

CROSS-REFERENCE TO RELATED APPLICATIONS

This application is a divisional application of my copending application for U.S. Pat. Ser. No. 476,747, filed June 5, 1974 now U.S. Pat. No. 3,923,089, which is a continuation-in-part of my copending application for United States patent, Ser. No. 353,049, filed Apr. 20, 1973, which is in turn a continuation-in-part of my application for United States patent, Ser. No. 149,517, filed June 3, 1971, now abandoned.

BACKGROUND OF THE INVENTION

1. Field of the Invention

The present invention relates to a nut, a nut and panel assembly, the method of assemblying the nut and panel, and the piercing tool for assembling same. More particularly, the invention relates to a nut having a counterbore indent terminating in a crown-shaped configuration for receiving panel material to stabilize the nut against the panel when a bolt is threaded into the nut and panel.

2. The Prior Art

The prior art includes the disclosure of a nut and panel assembly, wherein the nut includes a first circular bore for threadedly receiving a bolt and a counterbore tapering toward the nut face abutting the panel, as disclosed in U.S. Pat. No. 3,282,317 to Zahodiakin. The primary purpose for the tapering counterbore is to stabilize the nut on the metal panel assembly against axial displacement due to the push-off forces encountered when a self-tapping bolt, or the like, is threaded into the nut bore. Such an arrangement, however, does not preclude rotational displacement of the nut during the threading operation, which can cause cross-threading. Further, because the self-tapping bolt threads directly into the nut bore, the nut can be axially displaced from the panel even in view of the tapering counterbore locking arrangement.

Other prior art patents, for example as illustrated by U.S. Pat. No. 3,234,987 to Hentzi, disclose a nut configuration including a plurality of radial serrations for stabilizing the nut on the panel against rotational displacement during the threading operation. The Hentzi patent further includes the provision of a deformed nut edge for stabilizing the nut on the panel against axial displacement. However, the Hentzi patent discloses a nut having a threaded bore for receiving a male bolt member, rather than a circular bore for receiving a self-tapping bolt member, as contemplated in one of the preferred embodiments of the present invention. Should the Hentzi nut be employed in combination with a self-tapping bolt, it is quite probable that the nut would become displaced either axially or rotationally since the axial threading forces would be applied directly to the nut.

The present invention overcomes the prior art problems of nut rotational and axial displacement by the provision of a counterbore terminating in an annular face having a hill-and-valley configuration. Panel material circumscribed by the nut counterbore is pierced and deflected into the shape of an annular projection terminating in an end portion conjugate with and adjacent to the counterbore annular surface. The interlocking crown relationship between the nut counterbore and the deflected panel material stabilizes the nut against rotational and axial displacement during a bolt threading operation.

Other prior art patents, for example U.S. Pat. No. 2,004,182 to Arey, disclose piercing a panel and deflecting the panel material to assume a jagged end configuration. However, the Arey patent does not control the breakout of the pierced panel material, in contrast to the present invention which deflects the panel material into a counterbore terminating in an annular surface conjugate the terminal end of the panel breakout to stabilize the nut against rotational displacement during a self-tapping operation.

SUMMARY OF THE INVENTION

The present invention includes a nut having an attachment face for installation on a metal panel and a circular bore through the installation face to accommodate a bolt, which may or may not be of the self-tapping type. To stabilize the nut on the panel against rotational displacement during the bolt threading operation, the nut further includes a counterbore in the attachment face terminating in an annular surface having a crown-shaped configuration. The nut may additionally include a second counterbore tapering toward the attachment face to form a re-entrant groove for receiving panel material to stabilize the nut during the threading operation against axial displacement.

The method of installing the nut on a metal panel includes orienting the nut attachment face against the panel and piercing the panel in alignment with the nut bore with a piercing tool. The piercing tool includes an end having a plurality of intersecting flat surfaces thereon which are inclined relative to the nut bore axis and intersect to define a plurality of edges and a piercing point. The intersecting flat surfaces are defined by a plurality of "flats" in one embodiment and by a plurality of grooves in another embodiment. The piercing and installation procedure includes ramming the piercing tool through the panel material and into the nut bore to axially displace and extrude the panel material circumscribed by the nut counterbore into the nut. The deflected panel material assumes an annular configuration terminating in a plurality of pointed edges which are formed by the piercing tool edges. During the installation procedure the nut is oriented such that the counterbore crown-shaped annular configuration is aligned with the piercing tool so that the panel projection end is extruded into the counterbore indent to interlock the nut on the panel against rotational and axial push-off forces encountered during a bolt threading operation. In the preferred embodiment the nut includes a re-entrant groove defining a tapering recess. A portion of the panel material is extruded or ironed into the tapering recess by the punching action of the piercing tool and serves to further stabilize the nut on the panel against axial push-off forces.

The annular panel projection formed during the piercing operation is extruded into the nut counterbores, as previously described, and may have an inner diameter substantially the same as the diameter of the nut bore so that a continuous female thread may be formed through the panel projection and into the nut bore. When a self-tapping bolt is employed, as the bolt is threaded into the nut and panel assembly, it first threads into the panel projection material, which thereby absorbs axial threading forces exerted on the assembly by the bolt. As the bolt continues to thread into the assembly, it simultaneously threads through the pointed portions on the terminal end of the panel projection and into the inner side surfaces of the points defined by the counterbore indent configuration. The simultaneous threading operation into these two interlocking surfaces yields two highly desireable results. First, the nut is stabilized against rotational forces encountered during the threading operation; and second, the points defined by the nut counterbore provide a "lead-in" to assure a continuous thread from the panel material into the nut bore.

Naturally, these same advantages result from the interlocking crown-shaped panel projection and counterbore indent, regardless of the type bolt employed since these structural features stabilize the nut on the panel during a threading procedure, whether it be by a self-tapping bolt or otherwise.

During the bolt threading operation the panel projection material is expanded outwardly into tight peripheral engagement with the nut counterbore surfaces. Continued threading then draws the nut and panel tightly together, forming a secure panel assembly.

Accordingly, the prior art problems of stabilizing a nut on a metal panel during a threading operation is solved by the present invention through a single-stroke punch operation by controlling the breakout of the panel material during the piercing and installation procedure.

BRIEF DESCRIPTION OF THE DRAWINGS

FIG. 1 is a pespectively illustration of the nut forming the present invention.

FIG. 2 is a top plan view of the nut, illustrating the counterbore configuration which stabilizes the nut against a metal panel.

FIG. 3 is a vertical sectional view of the nut.

FIG. 4 is a sectional view along line 4—4 of FIG. 3.

FIG. 5 is an end view of the piercing tool, illustrating the tearing edges and flat surfaces which control the breakout of the pierced panel portion.

FIG. 6 is a partial sectional view illustrating the nut and panel within the piercing die for assembly.

DETAILED DESCRIPTION OF THE INVENTION

Figure 7:
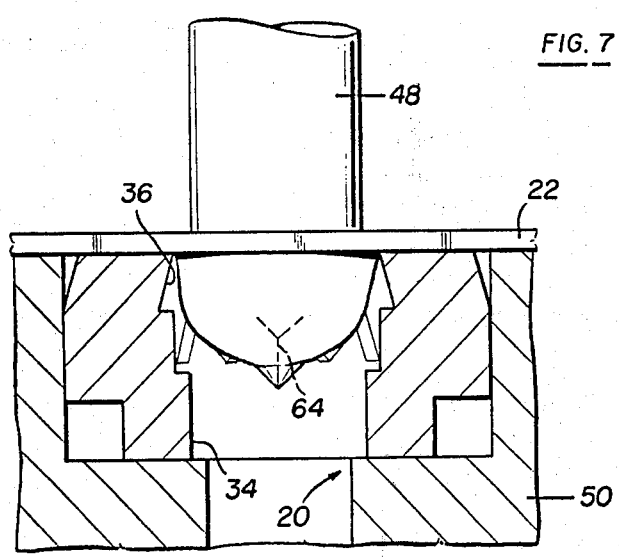
FIG. 7 and 8 are partial sectional views similar to FIG. 6, but illustrating the deflection of the panel material into the nut during installation.
Figure 8:
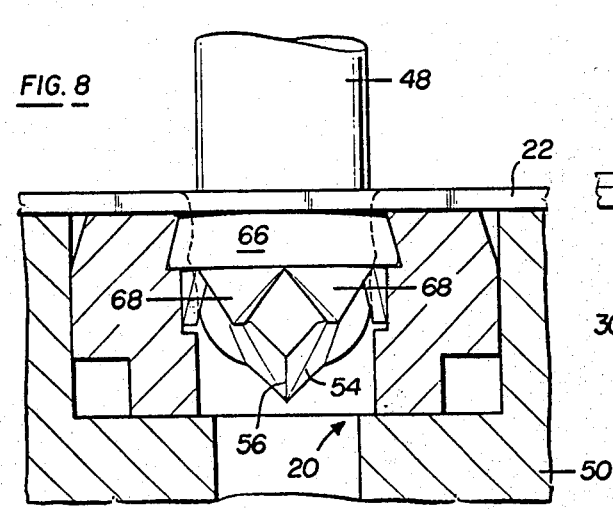
Figure 9:
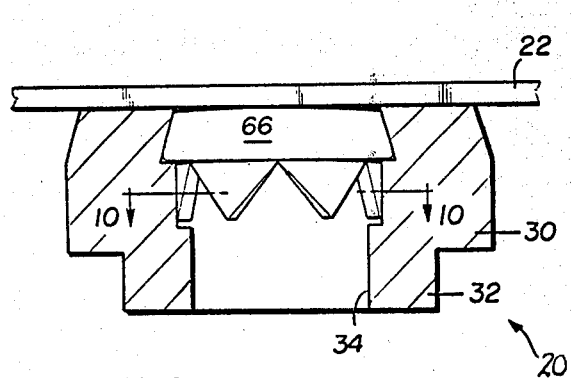
FIG. 9 is a partial sectional view illustrating the completed nut and panel assembly.
Figure 11:
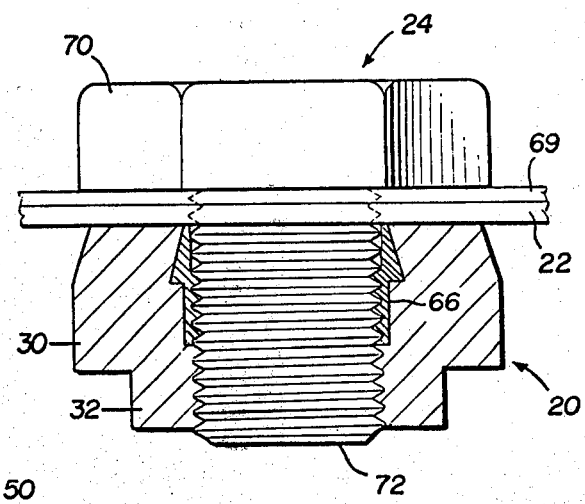
FIG. 11 is a partial sectional view illustrating the completed nut, panel, and bolt assembly, wherein the self-tapping bolt forms a continuous thread through the panel projection and into the nut bore.

The present invention relates to a nut 20 (illustrated in perspective in FIG. 1), the nut in combination with a panel 22 (as illustrated in FIG. 9), the nut and panel assembly in combination with a self-tapping bolt 24 (as illustrated in FIG. 11), and a piercing die 26 for installing the nut on the panel (as illustrated in FIGS. 6–8).

As illustrated in FIGS. 1–3, the nut 20 includes an end mounting face 28, a hexagonal pilot portion 30 and a cylindrical base portion 32, through which a circular bore 34 extends to receive the self-threading bolt 24. The outer configuration of the nut does not, per se, form a part of the present invention but is generally chosen on the basis of the particular application for the nut. However, as will be discussed in greater detail below, the outer configuration of the pilot portion may be employed for orienting the nut within the piercing die.

The nut 20 further includes a re-entrant groove 36, which tapers toward the end mounting face 28 to receive panel material for stabilizing the nut on the panel against axial and rotational displacement. The re-entrant groove 36 is formed from a first nut counterbore in accordance with the teachings of my U.S. Pat. No. 3,793,658, incorporated by reference. The inclusion of the re-entrant groove for stabilizing the nut on the panel is not critical to the present invention, as will become apparent from the discussion relating to the second embodiment of the nut illustrated in FIGS. 14 and 15. However, the incorporation of this groove within the present nut complements the overall structural arrangement of the nut and panel interlocking features proposed by the present invention.

A second counterbore or chamber 38 included within the nut 20 and terminates in an annular surface 40 having a plurality of "peaks and valleys" 42 and 44, respectively. Expressed another way, the peaks of the annular surface constitute points extending toward the nut end mounting face 28 to define a crown-shaped counterbore indent which receives panel material to stabilize the nut on the panel against rotational displacement when the bolt 24 is threaded into the assembly. This annular "hill-and-valley" or crown-shaped configuration of counterbore 38 is formed by a tubular "header die" (not shown) having an end configuration conjugate the peaks and valleys 42 and 44.

As best illustrated in FIG. 4, inner surfaces 46 of the peaks are cylindrical and axially aligned with the nut bore surface to form pointed extensions of the bore 34 to accommodate the bolt 24, as discussed in greater detail below. FIG. 4 also vividly illustrates the alternating hill and valley arrangement which serves as an interlock with the panel assembly after the panel has been pierced and the material circumscribed by the nut counterbores has been axially deflected into the nut during the piercing operation.

To assemble the nut and panel combination the component parts, i.e., the nut 20 and the panel 22, are positioned within a piercing die 26, comprising a piercing tool 48 and a die support 50. The piercing tool includes an elongated, prong-shaped member terminating in a rounded tip 52 having a plurality of inclined grooves 54, formed by grinding, for example. Each groove 54 includes a pair of inclined flat surfaces 55. These flat surfaces intersect to define tearing edges 56 and a piercing point 58, which control the breakout of the panel material deflected into the nut so that the terminal portion of the panel projection formed during the piercing and installing operation assumes a shape conjugate with and adjacent to the annular surface configuration 40 in the nut. The distal ends of the grooves 54 project away from the tearing edges and are circumferentially spaced.

Figure 12:
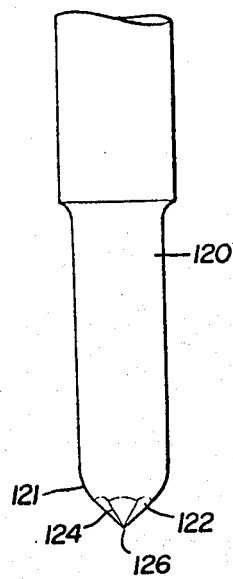
FIGS. 12 and 13 are side elevational and plan views, respectively, of a piercing tool for forming a panel projection to mate with the nut illustrated in FIGS. 14 and 15.

It has been found necessary to provide grooves, as opposed to "flats" as shown in FIG. 12, on any embodiment of the piercing tool which is to be used for forming a crown-shaped panel projection having six or more points. A piercing tool having six or more flats does not properly form the desired break-out configuration for the panel projection, whereas the provision of grooves accomplishes the desired effect. It is believed that the grooves provide sharper tearing edges 56 which can properly form the crown-shaped terminal portion of the panel projection for greater numbers of peaks or points.

The support die 50 includes a supporting surface 60 on which the nut 20 is positioned and a plurality of vertical surfaces for orienting the nut in proper relation to the tearing edges of the piercing tool 48. In order to properly position the nut in alignment with the piercing tool te number of surfaces 62 should correspond to the number of outer peripheral surfaces on the nut pilot 30. Accordingly, the die support 50 illustrated in FIG. 6 will have six vertical orienting surfaces 62 for properly positioning and accommodating the hexagonal pilot configuration of nut 20.

Prior to the piercing and installation procedure, the nut 20 is conveyed through a tumbler, well-known to those skilled in the art, where it is oriented with end mounting face 28 upwardly for position within the die support 50. In order to properly position the nut within the die support so that the counterbore annular configuration properly mates with the piercing tool tip structure, the number of side orienting faces 62 should be an integer of the number of annular points or valleys in the nut. For example, the nut illustrated in FIG. 2 includes six annular points, six annular valleys, and six sides. As previously discussed die support 50 also includes a hexagonal configuration similar to the outer configuration of the nut pilot portion 30. By this relationship the annular surface of the counterbore is properly positioned in relationship to the piercing tool end structure so that the breakout of the panel material properly mates and seats into the crown-shaped indent of the counterbore. This relationship between the piercing tool end structure and the nut annular counterbore configuration will hold true regardless of the rotational orientation position of nut 20 within the support die structure 50. Further it can be appreciated that a similar orientation within the piercing die will be occasioned when the number of points and valleys within the counterbore indent is a multiple of the number of nut pilot surfaces and die support orienting faces. It naturally follows, then, that the number of grooves or flats on the piercing tool top can also be a multiple of the number of die support orienting faces.

As illustrated in FIGS. 7 and 8, the piercing and installation procedure is effected by driving the piercing tool 48 through the panel material 22 in alignment with the axis of nut bore 34. The actual piercing or punching reciprocation of the piercing tool 48 results in an extrusion of the panel material circumscribed by the nut counterbore 38. Additionally, the panel material adjacent the edge of the counterbore forming the re-entrant groove is extruded or "ironed" into the tapering recess of the re-entrant groove for retaining the nut on the panel against axial displacement forces. As illustrated in FIG. 7, the piercing tool 48 has advanced into the counterbores of the nut to begin the extrusion process of the panel material. Reference numeral 64 indicates the panel material adjacent the tearing edges 56 of the piercing tool as it begins to tear to form a pointed end configuration which is extruded into the crown-shaped counterbore indent. As the piercing tool 48 is advanced into the nut bore, as shown in FIG. 8, the displaced panel material assumes an annular configuration 66 terminating in a crown-shaped end portion having a configuration conjugate the annular end surface of counterbore 38 and including a plurality of triangular-shaped projections 68. Due to the extrusion of the material, the projection thickness will be less than the panel thickness. The triangular-shaped end portions 68 are formed as projections between the tears in the extruded panel projection and are aligned with the flat surfaces on the tip of the piercing tool. The end portion of the panel projection 66 is slightly spaced from the annular counterbore configuration to allow the material to be extruded further when the bolt 24 is threaded. The space between the end of the panel projection and the annular counterbore surface is exaggerated in FIG. 8 for purposes of illustration.

The dotted lines in FIG. 8 illustrate the inner diameter of the panel projection and show that the inner diameter is greater in the region adjacent the re-entrant groove 36 due to the material having been ironed into said re-entrant groove.

Figure 10:
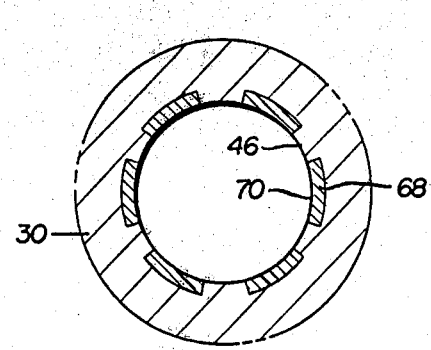
FIG. 10 is a sectional view along line 10—10 of FIG. 9, illustrating the interlocking relationship between the nut counterbore configuration and the terminal portion of the panel projection.

As illustrated in FIG. 10, the inner surfaces 70 of the projections 68 are cylindrical to define with the inner surfaces 46 an essentially smooth circular surface continuous with the bore surface 34. FIG. 10 also illustrates the interlocking characteristics of the panel projections 68 and the peaks 42 defined by the crown-shaped counterbore indent.

It can be seen from FIGS. 8 and 9 that all of the panel material deflected from the region circumscribed by the nut counterbores is utilized in the formation of the panel projection 66 and triangular tip portions 68. As a result, the piercing and installation procedure encompassed by the present invention eliminates the production of a metal slug which would otherwise litter the shop floor. FIG. 9 also illustrates that the inner diameters of the counterbore points and the panel points are substantially the same as the diameter of the bore 34, to enable a continuous thread.

FIG. 11 illustrates the nut and panel assembly in its designed application wherein a secondary panel 69 is secured to the metal panel 22 by the bolt 24, which consists of a bolt head 70 and a self-tapping shank 72 having a continuous male thread. To form the combination nut, bolt, and panel assembly, the bolt 24 is threaded into the terminal portion of the panel projection which has a reduced inner diameter, thereby expanding that portion of the panel material outwardly into tight peripheral engagement with the nut counterbore surfaces. Because the bolt first threads into the panel material the axial forces encountered during the threading operation are absorbed by the panel projection rather than by the nut itself. Accordingly, the nut 20 is stabilized on the panel assembly against axial displacement. Even when the end portion of the bolt 24 threads through the panel projection and into the nut bore 34, the major portion of such axial threading forces are still absorbed by the panel projection due to the portion of the threaded bolt shank in engagement with the previously formed threads. Any forces which are not absorbed by the threaded panel projection are counter-balanced by the interlocking feature of the panel material being radially displaced into the reentrant groove 36.

As the bolt continues to thread axially through the panel projection, it threads into the arcuate wall surfaces 46 of the points 42 defined by the crown-shaped counterbore indent. In actuality the points or peaks 42 are extensions of the bore wall surface 34 and thereby enable a gradual threading lead-in to the nut portion of the nut and panel assembly. Even further, the axial push-off forces normally encountered when the self-tapping bolt threads into the nut bore are eliminated since the nut is still in engagement with the crown-shaped end portion 68 of the panel projection.

It can also be seen from FIG. 11 that the space illustrated in FIG. 8 between the end portion of the panel projection and the annular surface 40 has been filled with panel material which was extruded downwardly during the threading operation. FIG. 11 further illustrates the region where bolt shank 72 first starts threading into the panel projection. After the bolt has been threaded into the nut and panel assembly, continued threading then draws the nut and panel tightly together, forming a secure panel assembly.

Figure 13:
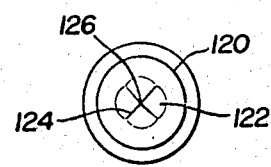

A second embodiment of the present invention is illustrated in FIGS. 12–15. FIGS. 12 and 13 illustrate a piercing tool 120 having a rounded tip 121 similar to the rounded tip 52 on the piercing tool 48. The tip 121 includes four flat surfaces or flats inclined relative to the longitudinal axis of the piercing tool and intersecting to define a plurality of tearing edges 124 and a piercing point 126. As discussed previously, it has been found that grooves are necessary for forming six or more points on the crown-shaped panel projection. However, when four or less points are desired, flats can be utilized. It is believed that the tearing edges defined by the flats for lower number of panel projection points are sufficiently sharp for defining the desired breakout.

Figure 14:
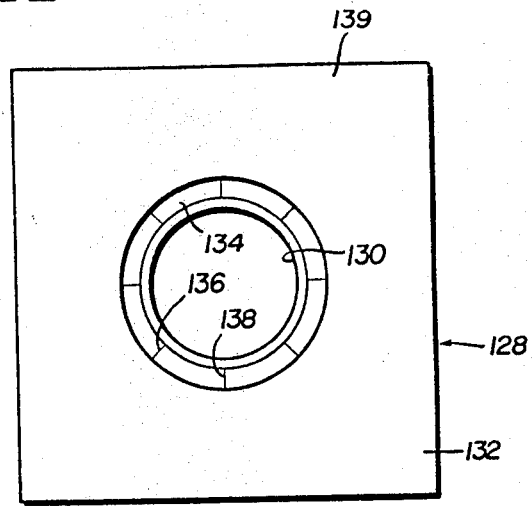
FIG. 14 is a top plan view of a second embodiment of the nut encompassing the present invention, wherein the nut is four-sided.

The nut for utilization in combination with piercing tool 120 is illustrated in FIG. 14 as including a four-sided nut 128. The nut includes a threaded circular bore 130 perpendicular to a mounting face 132 and a counterbore having an annular surface 134. In a manner similar to the embodiment of FIGS. 1–3, the annular surface 134 includes a plurality of peaks and valleys, 136 and 138 respectively. The particular embodiment illustrated includes four such peaks 136 to correspond to the number of pilot peripheral surfaces to accomodate the orientation of the peaks and valleys within the piercing die in relationship to the tearing edges and flats 124 and 122, respectively, on the piercing tool 120. As previously mentioned the re-entrant groove illustrated in the embodiment of FIGS. 1–3 is not critical to the present invention and, in fact, is not included within the nut embodiment of FIG. 14. This embodiment also contemplates a nut, panel and bolt assembly wherein the bolt is not of the self-tapping type. Accordingly, the threaded surface 130 is not longitudinally aligned with the inner wall surfaces of the interlocking crown-shapes of the counterbore and panel projection, as illustrated, so that the bolt may be threaded directly into the nut bore.

Figure 15:
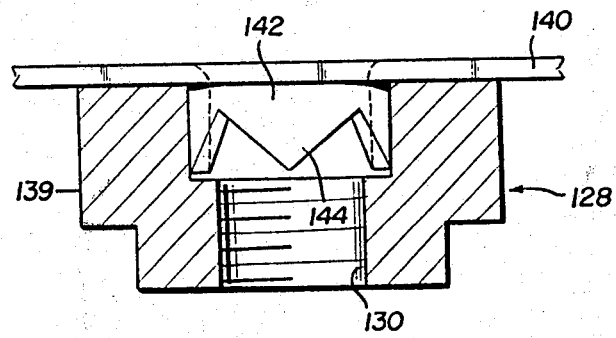
FIG. 15 is a partial sectional view illustrating a completed panel and nut assembly utilizing the nut illustrated in FIG. 14.

As illustrated in FIG. 15, the nut 128 is assembled on a panel 140 by the interlocking arrangement of the nut counterbore and the panel projection 142, which is formed in a die piercing operation by tool 120. Just as in the first embodiment, the panel projection 142 terminates in a plurality of triangular points 144 conjugate the shape of the annular counterbore surface 134 to interlock nut and panel to resist rotational displacement.

The method of assembling the nut and panel assembly disclosed in the two embodiments of the present application, then, includes orienting the nut mounting face against a metal panel in a piercing die so that the peaks of the nut counterbore annular surface align with the tearing edges of the piercing tool. Next, the piercing tool is driven axially into the panel material circumscribed by the nut counterbore and deflects that material axially of the nut bore. During the piercing step, the panel material is axially extruded into the nut to form an annular projection and the central portion of the deflected material is torn by the piercing tool edges to form the terminal portion of the annular projection which is conjugate and adjacent to the crown-shaped nut counterbore indent. In a nut embodiment including the re-entrant groove for stablizing the nut on the panel against axial displacement, the operation of the piercing tool extrudes or irons a portion of the deflected panel material into the tapering reentrant goove.

To complete the nut, bolt, and panel assembly, a bolt is threaded into the nut and panel combination. In the embodiment utilizing a self-tapping bolt, the bolt first threads into the annular panel projection formed during the piercing operation so that the axial threading forces are absorbed by the panel rather than by the nut. Subsequently the bolt simultaneously threads into the annular surfaces of the peaks defined by the crown-shaped counterbore indent and into the terminal portion of the panel projection. As a result of the interlocking relationship between the panel projection and the nut counterbore configuration, the nut is stablized on the panel against rotational displacement and the bolt properly threads into the nut bore surface.

It is to be understood that the previously described embodiments are merely examplary of the present invention and not intended to be limiting in any sense.

Having fully and completely described my invention, I now claim:

1. In a method of installing a nut on a metal panel, the nut having a flat end face and an axial bore generally perpendicular to said end face, said nut further having a counterbore concentric with said axial bore including a crown-shaped indent to define a plurality of points projecting toward said end face, the steps of:
   orienting said nut end face against a face of the panel;
   piercing the panel in alignment with the nut bore by a piercing tool having a tip including a plurality of tearing edges inclined relative to the nut bore axis, said tearing edges being aligned with each of the points of said counterbore; and
   deflecting the panel material circumscribed by said nut counterbore axially to form an annular panel projection terminating in a crown-shaped end conjugate and mating with said counterbore indent and radially outward into contact with the longitudinal surfaces defined by said counterbore.

2. The method as defined in claim 1, characterized by said assembly being completed by threading a self-tapping bolt simultaneously into the nut points defined by the counterbore indent and into the terminal crown-shaped end of the annular panel projection, and then threading said bolt into the axial nut bore.

3. The method as defined in claim 1, characterized by said annular panel projection being deflected radially outward into a nut groove adjacent to and tapering toward the nut end face.

4. In a method of installing a nut on a metal panel, the nut having an end face, a longitudinal axis generally perpendicular to said end face, and a chamber concentric with said longitudinal axis and opening through said end face, said chamber including at its distal end away from the end face an annular surface having a plurality of alternating, equally spaced hills and valleys, and a circular bore through said chamber distal end concentric with said longitudinal axis, the steps of:

orienting said nut end face against a face of the panel;

piercing the panel in alignment with said nut longitudinal axis by an elongated piercing tool having a tip including a plurality of tearing edges inclined relative to said nut longitudinal axis, the number of said edges corresponding to the number of annular surface points and said edges being aligned due to the orienting step, with said hills;

extruding the panel material circumscribed by the opening of said chamber axially into said chamber during said piercing step to form a generally annular panel projection; and tearing the terminal portion of said projection during the piercing step with said edges to form a projection end adjacent to and conjugate with said nut chamber annular surface, said projection terminal portion having a thickness less than the thickness of the metal panel due to the extrusion and tearing steps.

* * * * *